United States Patent Office 3,065,227
Patented Nov. 20, 1962

3,065,227
3α,9α-EPOXY STEROIDS OF THE ANDROSTANE AND PREGNANE SERIES
Raymond M. Dodson, Minneapolis, Minn., assignor to G. D. Searle & Co., Chicago, Ill., a corporation of Delaware
No Drawing. Filed June 13, 1961, Ser. No. 116,687
7 Claims. (Cl. 260—239.55)

This invention is concerned with 3α,9α-epoxy steroids and, more particularly, with 3α,9α-epoxy steroids of the androstane and pregnane series as represented by the structural formula

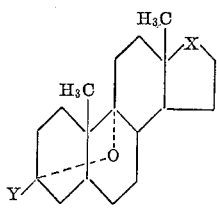

wherein X is a member of the class consisting of carbonyl, hydroxymethylene, (lower alkanoyl)oxymethylene, acetylmethylene

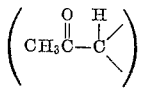

(α-hydroxyethyl)methylene

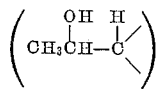

and α-[(lower alkanoyl)oxyethyl]methylene radicals; and Y is hydrogen or a radical selected from the group consisting of hydroxy, methoxy, and ethylthio.

The compounds of this invention can be prepared conveniently by employing 9α-hydroxyandrost-4-ene-3,17-dione and 9α-hydroxypregn-4-ene-3,20-dione as starting materials. Hydrogenation of these substances, typically in the presence of a palladium catalyst, produces the corresponding 3β-hydroxy-3α,9α-epoxides, which are methylated to afford the 3-methyl ethers. Reduction of the 17-oxo or 20-oxo group to a 17- or 20-hydroxy group followed by cleavage of the 3-methyl ether affords the corresponding diols. Preferential reaction of the 3-hydroxy group with ethyl mercaptan produces the 3-ethylthio compound, which is treated with Raney nickel to remove the 3-ethylthio substituent. These 17-hydroxy and 20-hydroxy-3α,9α-epoxides can be oxidized to afford the corresponding 17-oxo and 20-oxo compounds. The processes involved are specifically illustrated by the hydrogenation of 9α-hydroxyandrost-4-ene-3,17-dione in the presence of 5% palladium-on-carbon catalyst to afford 3α,9α-epoxy-3β-hydroxy-5β-androstan-17-one, which is treated with methanol and p-toluenesulfonic acid to produce the corresponding 3-methyl ether. Reduction of this ether, typically with sodium borohydride in aqueous methanol, followed by treatment with p-toluenesulfonic acid results in 3α,9α-epoxy-5β-androstane-3β,17β-diol. This diol affords, upon treatment with ethyl mercaptan and p-toluenesulfonic acid, 3α,9α-epoxy-3β-ethylthio-5β-androstan-17β-ol, which is converted to 3α,9α-epoxy-5β-androstan-17β-ol by heating with Raney nickel in ethnol. Oxidation of the latter substance by treatment with chromium trioxide in pyridine affords 3α,9α-epoxy-5β-androstan-17-one.

The compounds of this invention are useful as intermediates in the manufacture of the corresponding 9α-halo-11-oxygenated 3-keto-Δ⁴ derivatives, which are known substances possessing valuable pharmacological properties. Typically, the aforementioned 3α,9α-epoxy-5β-androstan-17-one is heated with p-toluenesulfonic acid in benzene to afford 3α-hydroxy-5β-androst-9(11)-en-17-one. Reaction with methyl magnesium bromide followed by acid hydrolysis produces 17α-methyl-5β-androst-9(11)-ene-3α,17β-diol. Oxidation of the 3-hydroxy group, suitably with chromium trioxide in pyridine, results in 17β-hydroxy-17α-methyl-5β-androst-9(11)-en-3-one, the 3-enol acetate of which is brominated to produce the corresponding 4-bromo derivative. Treatment of the latter substance with semicarbazide hydrochloride and sodium acetate affords the semicarbazone of 17β-hydroxy-17α-methylandrosta-4,9(11)-dien-3-one, which affords the parent ketone upon treatment with pyruvic acid. This 17β-hydroxy-17α-methylandrosta-4,9(11)-dien-3-one is allowed to react with hypobromous acid in the presence of N-bromoacetamide and perchloric acid to produce 9α-bromo-11β,17β-dihydroxy-17α-methylandrost-4-en-3 - one, which is converted to 17β-hydroxy-17α-methyl-9β,11β-epoxyandrost-4-en-3-one by reaction with potassium acetate in ethanol. Reaction of the latter epoxide with anhydrous hydrogen fluoride in tetrahydrofuran affords 9α-fluoro-11β,17β-dihydroxy-17α-methylandrost-4 - en - 3-one, a known potent androgenic and anabolic agent. In addition, the instant 3α,9α-epoxy-5β-pregnan-20-one displays valuable pharmacological properties. It is, for example, an anti-inflammatory agent as is evidenced by its ability to inhibit the local edema formation characteristic of inflammatory states.

The invention will appear more fully from the examples which follow. These examples are set forth by way of illustration only and it will be understood that the invention is not to be construed as limited in spirit or in scope by the details contained therein, as many modifications in materials and methods will be apparent from this disclosure to those skilled in the art. In these examples, temperatures are given in degrees centigrade (° C.). Quantities of materials are expressed in parts by weight unless otherwise noted.

Example 1

To a solution of 1.025 parts of 9α-hydroxypregn-4-ene-3,20-dione in 40 parts of methanol is added 0.1 part of 5% palladium-on-carbon catalyst, and the resulting mixture is shaken with hydrogen at atmospheric pressure and room temperature for about 3 hours. The catalyst is removed by filtration, and the filtrate is evaporated to dryness under reduced pressure. The residue is crystallized from acetone to afford the crude product, possessing a melting point of about 220–250°. This crude product is recrystallized from acetone-cyclohexane, then extracted with boiling hexane, and finally recrystallized from dilute acetone to produce 9α-hydroxy-5α-pregnane-3,20-dione, M.P. about 256–260°.

The mother liquor from the dilute acetone recrystallization is diluted with water, cooled and filtered to afford a solid material. This solid is dissolved in acetone-cyclohexane, and the solid which precipitates first from the solution is separated by filtration and discarded. Concentration of the filtrate yields pure 3α,9α-epoxy-3β-hydroxy-5β-pregnan-20-one, M.P. about 153–154.5°.

Example 2

To a solution of 2 parts of 3α,9α-epoxy-3β-hydroxy-5β-pregnan-20-one in 8 parts of methanol is added 0.5 part of p-toluenesulfonic acid, and this reaction mixture is allowed to stand at room temperature for about 15 hours. The mixture is made basic by the addition of solid potassium carbonate; ice and water are then added to initiate crystallization. The crystalline product is collected by filtration and washed with water to afford 3α,9α-epoxy-3β-methoxy-5β-pregnan-20-one, M.P. about 126–129°. Recrystallization from dilute methanol affords a pure sample which melts at about 131–132.5°.

*Example 3*

To a solution of one part of 3α,9α-epoxy-3β-methoxy-5β-pregnan-20-one in 8 parts of methanol containing 0.1 part of sodium hydroxide is added a solution of one part of sodium borohydride dissolved in 6.4 parts of methanol containing 2 parts of water. The resulting suspension is warmed on the steam bath for about 5 minutes to effect homogeneity, then allowed to stand at room temperature for about 10 minutes longer. Dilution of the reaction mixture with water results in precipitation of the product, which is separated by filtration and washed thoroughly with water. Recrystallization of this solid material from dilute methanol produces 3α,9α-epoxy-3β-methoxy-5β-pregnan-20β-ol, M.P. about 149–153°. Two further recrystallizations from dilute methanol produce a sample of the pure material melting at about 158–159°.

*Example 4*

To a solution of 2 parts of 3α,9α-epoxy-3β-methoxy-5β-pregnan-20β-ol in 70 parts of dioxane containing 35 parts of water is added 2 parts of p-toluenesulfonic acid, and this mixture is shaken thoroughly, then allowed to stand at room temperature for about 30 minutes. Dilution with water effects precipitation of the product, which is collected by filtration, washed thoroughly with water, and crystallized from dilute methanol to produce 3α,9α-epoxy-5β-pregnane-3β,20β-diol, M.P. about 215–217°.

*Example 5*

To a solution of one part of 3α,9α-epoxy-5β-pregnane-3β,20β-diol in 30 parts of acetic acid is added one part of p-toluenesulfonic acid and 8.4 parts of ethyl mercaptan. The reaction mixture is kept at room temperature for about 10 minutes, then poured into aqueous sodium carbonate. Extraction of this aqueous mixture with hexane containing a small amount of ether affords an organic solution, which is washed thoroughly with dilute aqueous sodium hydroxide, dried over anhydrous sodium sulfate, and evaporated to drynes in vacuo. The residue is crystallized first from dilute methanol, then from hexane to yield 3α,9α-epoxy-3β-ethylthio-5β-pregnan-20β- ol, M.P. about 125–127.5°. Further recrystallization from dilute methanol affords a pure sample melting at about 127.5–128.5° and exhibiting an optical rotation of +10° in chloroform.

*Example 6*

To a solution of one part of 3α,9α-epoxy-3β-ethylthio-5β-pregnan-20β-ol in 40 parts of ethanol is added 16 parts of W-2 Raney nickel catalyst, and the resulting suspension is heated at reflux for about 5 hours. The catalyst is removed by filtration and washed with ethanol, and the filtrate is concentrated to dryness in vacuo to produce 3α,9α-epoxy-5β-pregnan-20β-ol.

*Example 7*

To a solution of 8 parts of 3α,9α-epoxy-5β-pregnan-20β-ol in 350 parts of pyridine is added a solution of 8 parts of chromic acid in 350 parts of pyridine. The reaction mixture is stored at room temperature for about 24 hours, then poured into water and extracted with 50% benzene in ether. The organic extract is washed with water, dried over anhydrous sodium sulfate, and evaporated to drynes in vacuo. Crystallization of this solid from hexane affords pure 3α,9α-epoxy-5β-pregnan-20-one, M.P. about 135–136.5°.

*Example 8*

A mixture of 10.12 parts of 9α-hydroxyandrost-4-ene-3,17-dione, 200 parts of methanol, and one part of 5% palladium-on-carbon catalyst is shaken in a hydrogen atmosphere at room temperature and 3 atmospheres' pressure until the absorption of hydrogen is complete. The catalyst is removed by filtration and washed with methanol, and the filtrate is evaporated to dryness. Successive recrystallization of the residue from acetone-hexane, dilute methanol, and dilute acetone affords pure 3α,9α-epoxy - 3β - hydroxy-5β-androstan-17-one, M.P. about 222.5–224.5°; $[\alpha]_D = +116.8°$ (chloroform).

*Example 9*

To a solution of 2.05 parts of 3α,9α-epoxy-3β-hydroxy-5β-androstan-17-one in 24 parts of methanol is added 0.5 part of p-toluenesulfonic acid, and the resulting solution is stored at room temperature for about 16 hours, then neutralized by the addition of solid anhydrous potassium carbonate. This mixture is diluted with water and the resulting precipitate is collected by filtration and dried to produce 3α,9α - epoxy-3β-methoxy-5β-androstan-17-one, M.P. about 97–98.5°. Crystallization of this material first from dilute methanol, then from hexane affords a sample which melts first at 96.5°, then re-solidifies and melts again at 101.5°. In chloroform solution it exhibits an optical rotation of +92.1°.

*Example 10*

A solution of 1.5 parts of 3α,9α-epoxy-3β-methoxy-5β-androstan-17-one in 8 parts of methanol containing 0.1 part of sodium hydroxide is mixed with a solution of 1.5 parts of sodium borohydride in 6.4 parts of methanol containing 2 parts of water, then allowed to stand at room temperature for about 15 minutes. Water is added to the reaction mixture, and the resulting aqueous mixture is extracted with ether The organic layer is separated washed with water and evaporated to dryness in vacuo The residue is dissolved in 10 parts of dioxane and 6 parts of water containing 0.5 part of p-toluenesulfonic acid, and the resulting solution is allowed to stand at room temperature for about 30 minutes. Crystallization of the product occurs on standing. Water is then added and the crystalline product is collected by filtration, washed with water on the filter, and dried to yield 3α,9α-epoxy-5β-androstane-3β,17β-diol, M.P. about 211–213.5°. Recrystallization of this product from dilute methanol affords a pure sample melting at about 218–219°; $[\alpha]_D = +39.3°$ (chloroform).

*Example 11*

To a solution of 3 parts of 3α,9α-epoxy-5β-androstane-3β,17β-diol in 20 parts of acetic acid is added 0.5 part of p-toluenesulfonic acid and 2.52 parts of ethyl mercaptan, and the resulting mixture is shaken until homogeneous. This solution is allowed to stand at room temperature for about 10 minutes, then poured into about 300 parts of 10% aqueous sodium hydroxide containing ice. The resulting oil crystallizes on standing, and is collected by filtration to afford 3α,9α-epoxy-3β-ethylthio-5β-androstan-17β-ol, M.P. about 108–108.5°; $[\alpha]_D = +18°$ (chloroform).

*Example 12*

To a solution of 1.5 parts of 3α,9α-epoxy-3β-ethylthio-5β-androstan-17β-ol in 60 parts of ethanol is added 24 parts of W–2 Raney nickel, and the resulting suspension is heated at reflux for about 5 hours, then filtered to remove the catalyst. The catalyst is washed on the filter with ethanol and the filtrate is evaporated to dryness under nitrogen. Recrystallization of the residue, first from hexane containing acetone, then from acetone affords pure 3α,9α-epoxy-5β-androstan-17β-ol, M.P. about 188–188.5°; $[\alpha]_D = +38°$ (chloroform).

*Example 13*

The substitution of an equivalent quantity of 3α,9α-epoxy-3β-hydroxy-5β-androstan-17-one in the procedure of Example 11 results in 3α,9α-epoxy-3β-ethylthio-5β-androstan-17-one, M.P. about 140–141°.

Example 14

The substitution of an equivalent quantity of 3α,9α-epoxy-3β-ethylthio-5β-androstan-17-one in the procedure of Example 12 results in 3α,9α-epoxy-5β-androstan-17-one.

Example 15

To a solution of 2.2 parts of 3α,9α-epoxy-5β-androstan-17-one in 80 parts of aqueous methanol is added 2.5 parts of sodium borohydride, and the resulting solution is allowed to stand at room temperature for about 15 minutes. Dilution of this reaction mixture with water results in precipitation of the product, which is collected by filtration and dried to produce 3α,9α-epoxy-5β-androstan-17β-ol, identical with the product of Example 12.

Example 16

A mixture of one part of 3α,9α-epoxy-3β-methoxy-5β-pregnan-20β-ol, 10 parts of acetic anhydride and 20 parts of pyridine is stored at room temperature for about 20 hours, then diluted with ice and water. The resulting precipitate is collected by filtration and dried to yield 3α,9α-epoxy-3β-methoxy-5β-pregnan-20β-ol 20-acetate, M.P. about 150–156°. Two recrystallizations from methanol results in the pure material, M.P. about 158–159.5°; $[\alpha]_D = +47°$ (chloroform).

Example 17

The substitution of equivalent quantities of 3α,9α-epoxy-5β-pregnan-20β-ol or 3α,9α-epoxy-5β-androstan-17β-ol in the procedure of Example 16 results in 3α,9α-epoxy-5β-pregnan-20β-ol 20-acetate and 3α,9α-epoxy-5β-androstan-17β-ol 17-acetate.

What is claimed is:

1. A compound of the structural formula

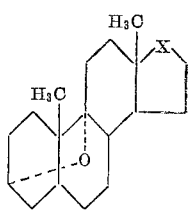

wherein X is selected from the group consisting of carbonyl, β-hydroxymethylene, β-(lower alkanoyl)oxymethylene, and acetylmethylene radicals.

2. A compound of the structural formula

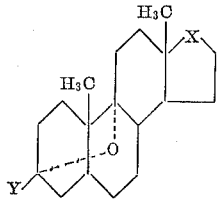

wherein Y is selected from the group consisting of hydroxy, methoxy, and ethylthio radicals, and X is selected from the group consisting of carbonyl, β-hydroxymethylene, (α-hydroxyethyl)methylene, β-(lower alkanoyl)oxymethylene, and [α-(lower alkanoyloxy)ethyl]methylene radicals.

3. 3α,9α-epoxy-3β-methoxy-5β-pregnan-20-one.
4. 3α,9α-epoxy-5β-pregnan-20-one.
5. 3α,9α-epoxy-5β-androstan-17β-ol.
6. 3α,9α-epoxy-3β-ethylthio-5β-pregnan-20β-ol.
7. 3α,9α-epoxy-5β-androstane-3β,17β-diol.

No references cited.